United States Patent [19]

Melamud et al.

[11] 4,345,314
[45] Aug. 17, 1982

[54] DYNAMIC THRESHOLD DEVICE

[75] Inventors: Robert C. Melamud, Tokyo, Japan; James D. Nihart, Harrisburg; James M. White, Charlotte, both of N.C.

[73] Assignee: International Business Machines Corporation, Armonk, N.Y.

[21] Appl. No.: 208,221

[22] Filed: Nov. 19, 1980

[51] Int. Cl.³ .......................... H04N 1/40; G06F 15/20
[52] U.S. Cl. ..................................... 364/515; 358/166; 358/282; 358/284
[58] Field of Search ................ 364/515; 358/166, 167, 358/282, 283, 284; 340/146.3 B

[56] References Cited

U.S. PATENT DOCUMENTS

| | | | |
|---|---|---|---|
| 3,267,293 | 8/1966 | Hinds | 307/88.5 |
| 3,800,078 | 3/1974 | Cochran et al. | 358/167 X |
| 3,988,602 | 10/1976 | Gorsica, Jr. | 364/515 |
| 4,133,008 | 1/1979 | Tisue | 358/282 |
| 4,251,837 | 2/1981 | Janeway | 358/282 X |
| 4,258,394 | 3/1981 | Kennedy | 358/284 |

OTHER PUBLICATIONS

J. F. Jarvis, C. N. Judice and W. H. Ninke; "A Survey of Techniques for the Display of Continuous Tone Pictures on Bilevel Displays; Computer Graphics and Image Processing," vol. 5, pp. 13–40, 1976.

K. Y. Wong; "Multi-function Auto Thresholding Algorithm"; IBM Technical Disclosure Bulletin, vol. 21, No. 7, pp. 3001-3003, Dec. 1978.

Primary Examiner—Jerry Smith
Attorney, Agent, or Firm—E. Ronald Coffman

[57] ABSTRACT

A two-dimensional history of reflectance values, from which black-white threshold decisions are made, is stored in a relatively small amount of memory. Updating of the history by non-linear functions is accomplished through the use of look-up tables.

6 Claims, 6 Drawing Figures

DYNAMIC THRESHOLD DEVICE

The processing of pictures or other images by digital equipment for transmission, analysis, transformation, etc. often employs a technique by which the image is reduced to a finite number of picture elements or pels, each of which is represented as a pure binary quantity, i.e., black or white, and therefore can be treated in the processing equipment as a single data bit having the significance 1 or 0. This technique is particularly satisfactory for the processing of line copy documents such as printed text and line drawings.

To derive an electronic version of an image, in terms of 1's and 0's representing its pels, some form of photoelectric scanning device is employed which produces an analog electrical signal, the magnitude of which is a function of the light reflected from the document bearing the image. In addition to variations in reflectivity resulting from the desirable part of the image, the signal is also influenced by variations in the light source, smudges, background colors and defects in the image itself, as well as variations in the sensitivity of the image sensor. Accordingly, it is necessary to extract the significant image-related reflection variations and to suppress the remaining variations from the analog signal. This separation is generally accomplished by establishing a threshold value against which the reflectance signal is compared. The result of the comparison is a binary decision, such that wherever the reflectance value exceeds the threshold, one color, e.g. black, is selected and, conversely, where the threshold is not exceeded, the opposite color, e.g. white, is selected.

It has been found useful to provide threshold values that vary so as to be representative of the average reflectance in a small region in the vicinity of a picture element for which a black/white decision is being made. Techniques are known employing both analog circuitry, e.g., integrating capacitors, as well as digital circuitry, e.g., digital low-pass filters or the explicit calculation of averages of adjacent pel reflectance values.

The effectiveness of any particular technique depends upon its balance among several factors, including its accuracy, its cost of implementation, the amount of data processing effort required for its computation, and its versatility in handling a variety of different situations.

An object of our invention has been to provide a thresholding technique that is particularly suited for processing line copy images and provides a high degree of accuracy and flexibility with a minimum requirement for storage and data processing power.

Another object of our invention has been to provide a thresholding technique that is implemented in hardware in a manner such as to permit revision of its fundamental operating parameters to accommodate widely varying circumstances.

SUMMARY OF THE INVENTION

Our invention accomplishes these objects by employing reference values from which a threshold value is computed which implicitly, rather than explicitly, represents the reflectance characteristic of a surrounding region. This arrangement requires a minimum storage of picture element reflectance values, since one reference value is stored for each of, for example 2048 columns or vertical pel positions in a horizontal line, and one additional value that is cumulative of horizontal history. This can be contrasted with a system desiring to compare a region, 5 pels by 5 pels, for each point in a horizontal line, which would require essentially the storage of reflectance values for five horizontal lines. The implicit reference values are computed, or updated, during each thresholding decision cycle as a function of the difference between a newly presented pel and the existing horizontal reference value and between the horizontal reference value and the appropriate column reference value. We prefer to employ certain non-linear functions of these differences which are selected to enhance the performance of our thresholding device. To perform these non-linear functions at the required speed and with a minimum of data processing power, we prefer to employ look-up tables containing the function as our computational method. Indeed, the use of look-up tables, in combination with the use of implicit reference values, makes it practical to treat a two-dimensional reflectance history with a relatively high level of sophistication at realistic speeds. One example of a non-linear function which we find useful provides for a more rapid change of the reference value in response to changes of small magnitude in the direction of the background color (white) than for small changes in the direction of the image color (black). This non-linearity causes the ultimate threshold value to tend to closely follow the actual background reflectance value in low contrast areas. Another example of a non-linearity provides for the more rapid update of the reference value in response to large changes in the direction of the image color (black) than is the response to small changes. This non-linearity helps to maintain sharp image edge definition by selecting only the peak areas of black indicating reflectance thereby eliminating smudges and low contrast areas.

To assist the accuracy of our thresholding technique, particularly in regions of large background area or large broad-image areas, we further provide a non-linear bias which we prefer to implement also in the form of a table look-up. This bias responds to the absolute value of the picture element being tested to make picture elements which on an absolute scale tend to be white, appear more white, and to make those picture elements which on an absolute scale tend to be black, (for example, above 60% of the maximum black value) be slightly more black when supplied to the comparison circuitry. Thus, where a pel being tested has an absolute value very close to the value selected for thresholding, a decision will be made on the basis of the bias.

These and other objects, features and advantages of our invention will be apparent to those skilled in the art from the following description of a preferred illustrative embodiment of our invention, wherein reference is made to the accompanying drawings, of which:

Figure 1:
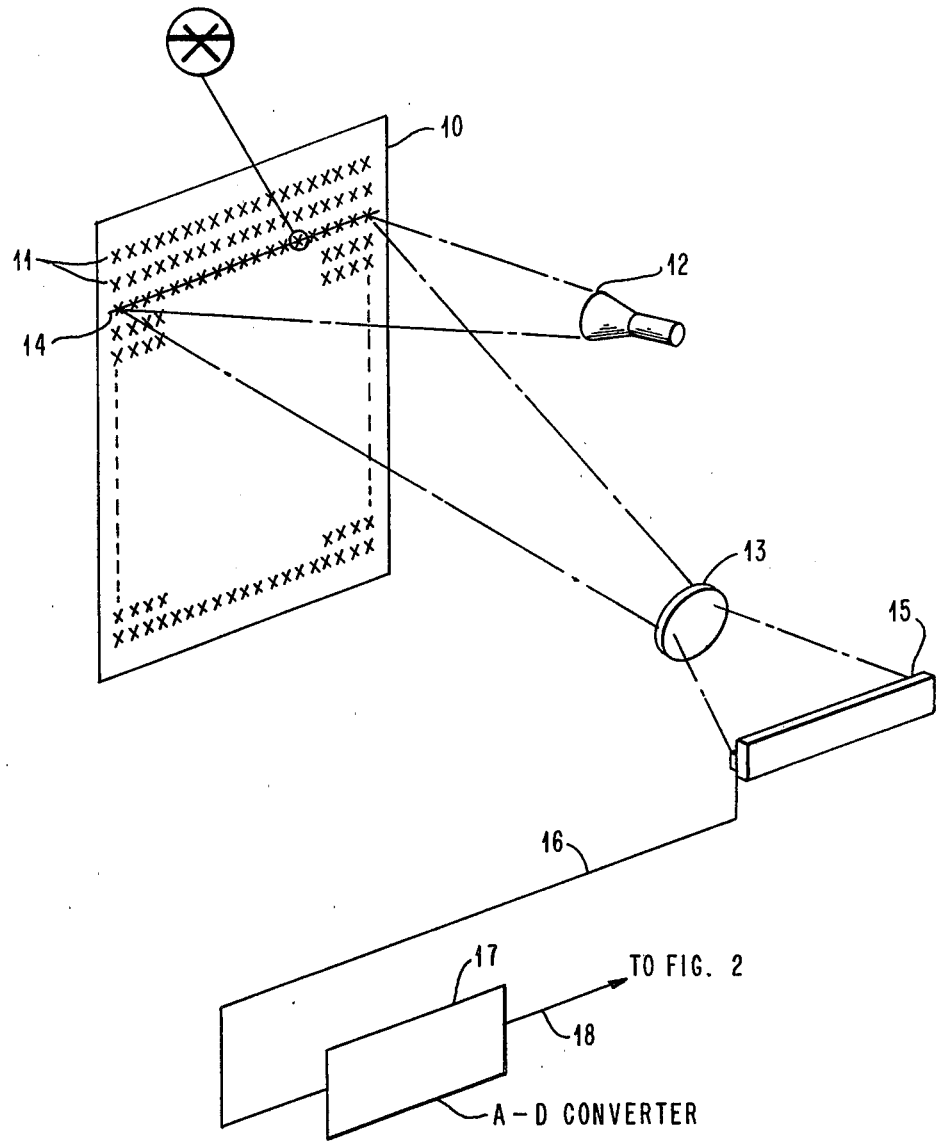
FIG. 1 shows a diagramatic view of an image scanner for producing a series of digitized reflectance signals.

Referring now to FIG. 1, there is shown diagramatically a page 10, bearing an image comprising lines of text 11 to be scanned. An optical system, including illumination source such as a lamp 12 and lens 13, focuses an illuminated image of a narrow horizontal band 14 of the page 10 onto the surface of a linear optical scanner or transducer 15. The scanner 15 can be of any known construction, for example, a linear array scanner of the charge-coupled device technology having, for example, 2048 photo-detection sites can be employed.

Relative movement in the vertical direction between page 10 and lens 13 causes successive bands 14 to be projected onto the scanning array 15. Clock pulses from a source not shown, applied to array 15, cause a series output of signals such as voltage levels or pulses for each scan line. The signals each have a magnitude that is a function of the image optical density or intensity of reflected light received by a photodetection site. The series of signals are fed sequentially onto output line 16 as a video signal train. In this manner, each incremental band 14 of page 10 is optically presented to scanner 15 and is in turn broken into 2048 picture elements, or pels, each of which is quantitized into an analog signal in the video output applied line 16 and is converted by A to D converter 17 to a 6-bit digital numeric quantization or amount on a scale from 0 to 63. The quantitized pel signal is applied to digital output line 18.

Our invention provides thresholding mechanism for determining whether to treat each of these pels as either black or white.

Figure 2:
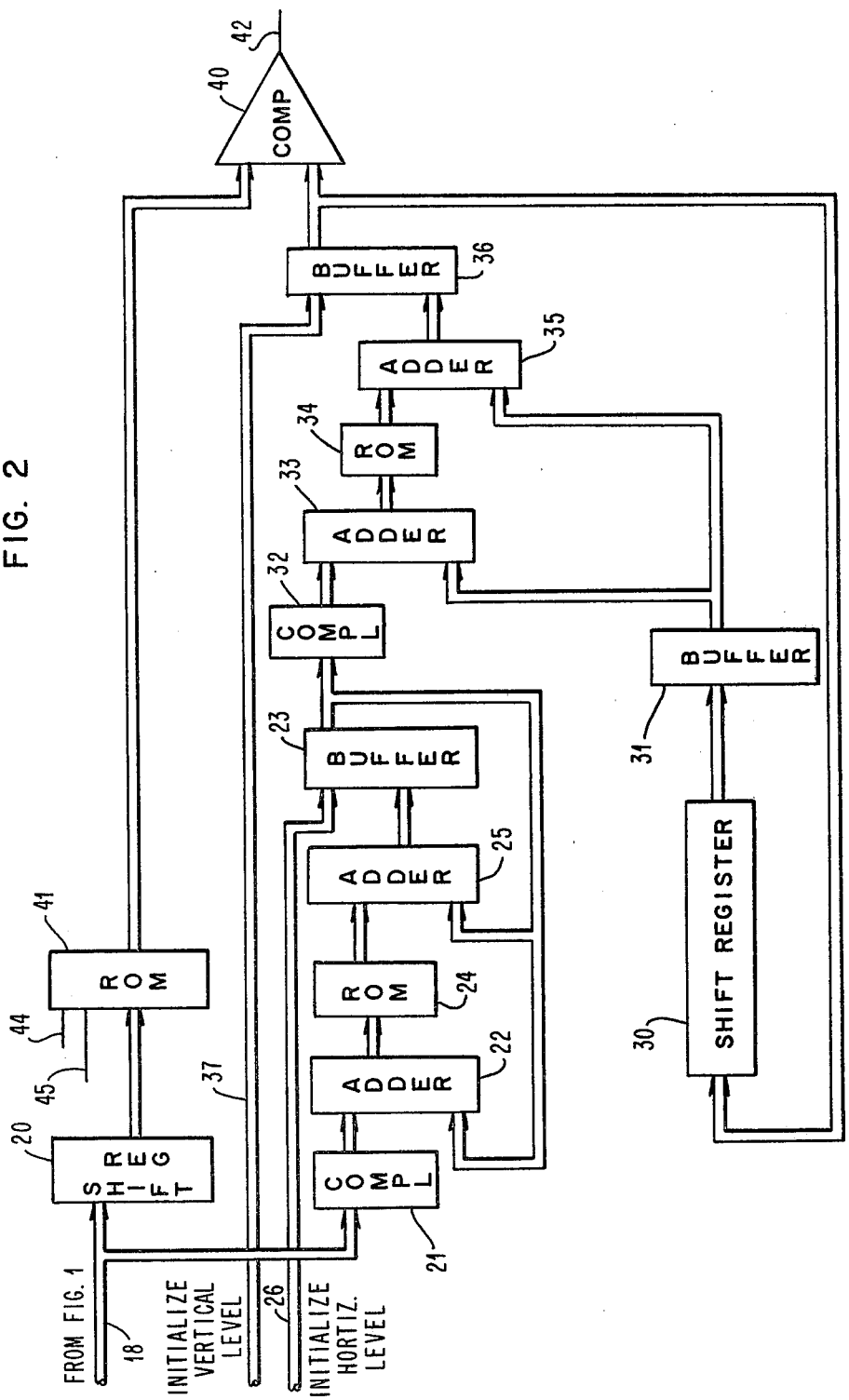
FIG. 2 shows a diagramatic view of thresholding circuitry constructed in accordance with our invention for operating on the digitized reflectance signals received from the scanner of FIG. 1.

The digital reflectance signal for each pel is applied during an operating cycle to the electronic logic circuitry shown in FIG. 2. The digital output of A to D converter 17 is applied directly to the input of a shift register delay device 20 and through negating or complementing logic 21 to the six most-significant-bits of an 8-bit adding circuit 22. A horizontal reference value or amount, stored in an 8-bit buffer 23, is also applied to adder 22.

The difference output, consisting of the carry or sign bit plus the seven most-significant-bits of the output value, is applied to the address register of a read-only memory 24 which produces an 8-bit updating factor to be combined in adder 25 with the horizontal reference from buffer 23 to produce an updated horizontal reference value, the results of the combination by adder 25 are supplied as an 8-bit code to buffer 23 to replace the previous horizontal reference value. Buffer 23 is initialized at the beginning of an operation by a stored value applied to input line 26.

A shift register line memory 30 includes 2048 8-bit stages for storing a column or vertical reference value or amount for each elemental column of the page. The shift register 30 is synchronized with the clocking of pulses from scanner 15 such that output from shift register 30 will, during an operating cycle, contain the column reference value corresponding to the column from which an input pel, then applied to complementing circuit 21, was derived.

The new updated horizontal reference value, computed above, is next supplied through negator or complementing circuitry 32 to an adder 33, whereby it is subtracted from the column reference value received from buffer 31. The difference output, consisting of the carry or sign bit plus the seven most-significant-bits of the output value, computed by adder 33, is applied to the address register of a read-only memory 34 which produces an 8-bit updating factor to be combined in adder 35 with the column reference from buffer 31. The resulting updated vertical reference of this combination is supplied as an 8-bit code to reference output buffer 36. Buffer 36 is initialized at the beginning of an operation by a stored value applied to input line 37.

The thus-computed output reference value stored in buffer 36 is applied to one input of comparison circuitry 40. The other input to comparison circuitry 40 receives test pel information from the shift register 20, which information may be modified in accordance with a bias function stored in read-only memory 41. In comparison circuitry 40, a decision is made whether the test pel data is greater than or less than the reference data and produces a 1 or a 0 on its output line 42, indicating a black or white decision. The output reference value in buffer 36 is also stored in line memory 30 where it will provide a column reference during processing of the subsequent line.

Figure 3:
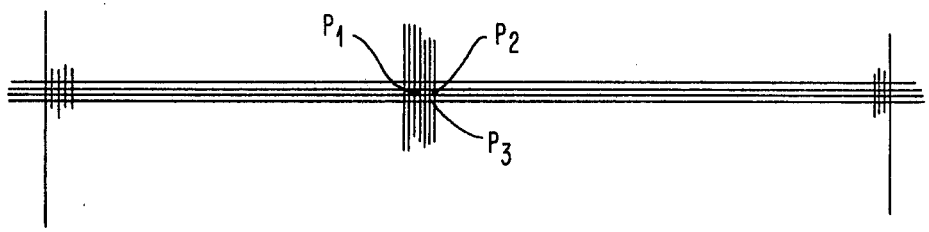
FIG. 3 shows an enlargement of the scan pattern employed in the scanner of FIG. 1.

In the preferred embodiment, it is desired to base the black-white decision on reflectance data on all sides of the test pel. To this end, shift register 20 is employed to provide a look-ahead function. As illustrated in FIG. 3, for example, the test pel for which a decision is being made is labeled $P_1$. We provide shift register 20 with four stages. Thus, the reflectance data of pel $P_1$ will be supplied by shift register 20 to the comparison circuit 40 via read-only memory 41 four cycles after it was introduced to shift register 20, i.e., during the same cycle as the pel labeled $p_2$ is presented on the input line from A to D converter 17 to negation circuit 21. The decision made on pel $p_1$, includes not only intelligence gathered during scanning rightwardly to pel $p_1$, but, in addition, intelligence gained by scanning beyond pel $p_1$. Alternately, by providing shift register 20, with 2052 stages, a delay of one line plus four pels is introduced. The test pel $p_1$ will be presented to comparison circuitry 40 at the time that pel $p_3$ of FIG. 3 is presented from the A to D converter 17.

We prefer to implement the circuitry shown above in the form of pipeline logic wherein the computations are made progressively two scanning cycles. This arrangement provides an additional delay due to buffers 23 and 36 between the input of a pel value and the resultant decision that reduces by two the number of stages required in shift register 20.

The computation required for our invention is facilitated by the use of table look-up memories 24, 34 and 41. These memories store the non-linear functions which our invention requires and thus reduces actual computation to simple addition or subtraction.

Figure 4:
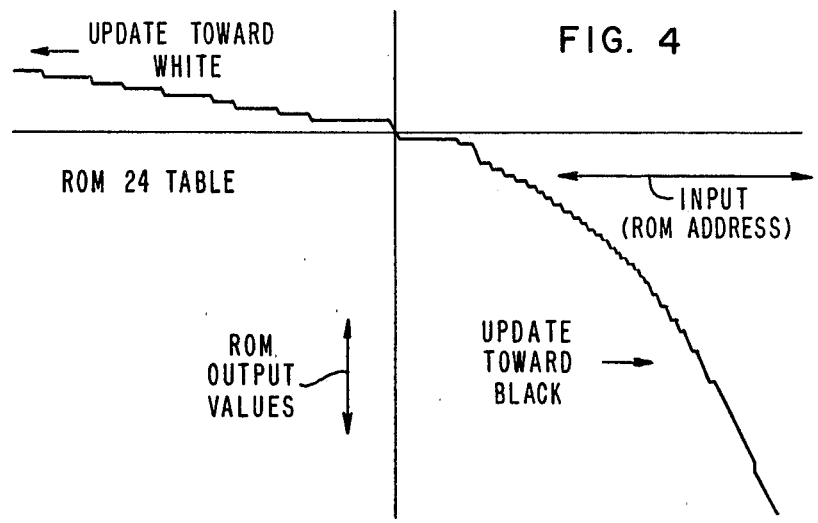
FIG. 4 shows a graphical representation of a non-linear function, employed in our invention for updating the horizontal reference employed in our thresholding circuitry.

A preferred horizontal update function, as stored in memory 24, is shown in FIG. 4. The horizontal axis represents the difference between an actual reflectance value from the A to D converter 17 and the immediately preceding horizontal reference value from the buffer 23. This difference is centered on the vertical axis since the difference can either be positive or negative. A difference indicating a change toward the black lies on the right-hand side of the vertical axis, while changes toward the white lie on the left-hand side of the vertical axis. The difference, as represented by the horizontal axis, is applied as a number to the address register of the memory 24. The data stored at that address is represented by the vertical axis of FIG. 4, which is the output of the non-linear function. The vertical scale reflects the updating factor to be added to or subtracted from the previous horizontal reference value in adder 25, to derive a new horizontal reference value. The positive numbers, which appear above the horizontal axis, will be added to the previous reference value to make the value more white, whereas updating factors appearing below the horizontal axis will be subtracted from the previous horizontal reference value to make the new horizontal reference value more black. To more easily appreciate the nature of the function illustrated in the FIG. 4, one can imagine a straight line extending downwardly and to the right through the 0 point of the graph and having a slope such that the input (horizontal axis) is equal to the output (vertical axis). Such a line would produce a correction factor that exactly equals the difference between the old reference value and the current pel reflectance. In such case, the output updating factor would equal the input difference and the old reference value would be made to equal the current input pel. If this imaginary line were to be rotated counter-clockwise, it is seen that the update factor will change in the direction of the input difference, but at a rate slower than the difference itself. Such a line is approximated by the curve in left-hand portion of FIG. 4, indicating that the updating factor will follow a tendency toward the white at a fairly constant proportional rate. The curve actually is offset vertically somewhat to accelerate the tendency for the reference value to follow small changes to the white. The curve to the right, however, shows an increasing slope by which large changes toward the black are followed even more rapidly.

Figure 5:
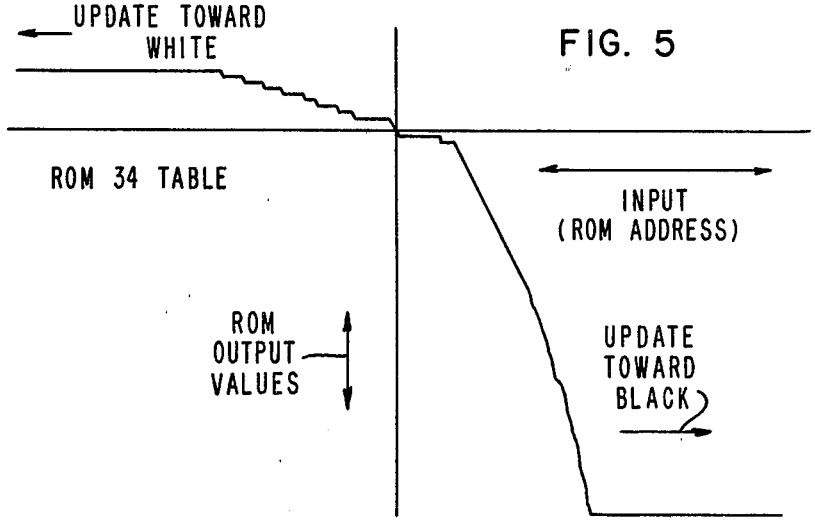
FIG. 5 shows a graphic representation of a non-linear function employed for updating the vertical reference value in the circuitry of our invention.

FIG. 5 shows a preferred column or vertical update function, as stored in memory 34. This function has characteristics and an operation similar to that of the horizontal function, but with the differences that extreme input differences toward both black and white produce outputs that are limited, as shown by the upper and lower horizontal lines.

Figure 6:
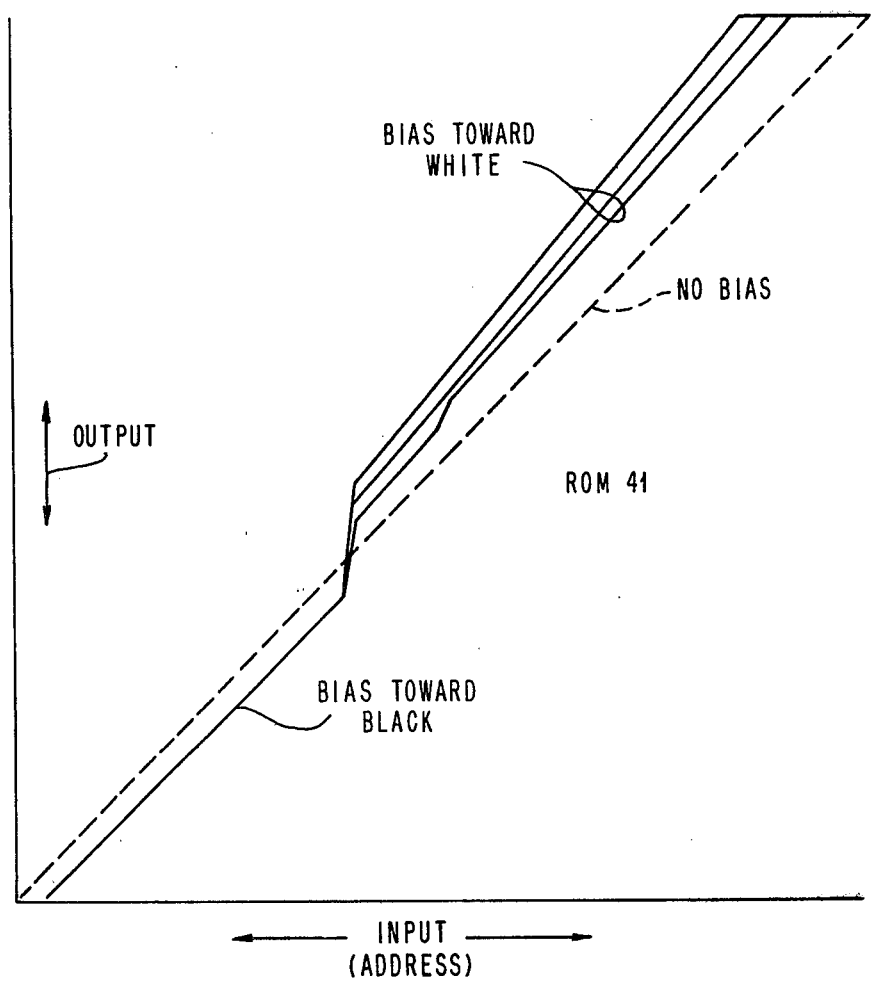
FIG. 6 shows a graphical representation of three alternate non-linear bias functions which may be employed in the thresholding circuitry of our invention.

FIG. 6 shows several bias functions as may be stored in memory 41. The purpose of the bias function is to distort slightly the actual test pel reflectance to assist in producing the desired black/white decision in those situations where there are very small differences between the output reference value and the test pel. This condition will exist wherever a fairly broad region of constant color, black or white, has been scanned. In such circumstance, resort is had to the absolute value of the reflectance as implemented through the bias shown in FIG. 6. FIG. 6 shows, on the horizontal axis, the actual test pel reflectance which serves as an address to memory 41. Increasing numbers to the right indicate an increase toward the color white. The vertical axis, or output of the function table memory 41, shows increasing white moving upwardly. The broken line drawn at 45° to the axes represents no bias, since the output is equal to the input. Note that at about 40% of the horizontal scale range, the bias curves move from a region below the 45° line to a region various degrees above the 45° line. Thus, in the lower portion of the function, toward the black end of the absolute scale, the output is made somewhat more black, such that in broad regions tending to be quite black, a decision will be made to call a point black. Conversely, above the crossover point, various biases are shown wherein the input signal is made somewhat more white. This tends to keep background areas white. Selection of one of several bias curves is accomplished by the application of additional address 44 and 45 inputs to the memory 41. One curve may produce better results for copy with grey background whereas another may perform better or copy having clean white background. Those skilled in the art will recognize that the bias function can be accomplished as shown or, alternatively, could be applied in a converse sense to the reference input to comparison circuitry 40 or to both inputs in combination.

We claim:

1. A thresholder for input signals, representing the optical density of elements of a two-dimensional density varying image, wherein transducer means produces series of such input signals, each series corresponding to density variations along a first dimension of the image, and wherein the improvement comprises information storage means for storing a first reference amount and a plurality of second reference amounts, first means for combining an amount representing one of said input signals with said first reference amount in accordance with a function of the difference therebetween to produce an updated first reference amount and for operatively replacing in said storage means said first reference amount with said updated first reference amount, second means for combining said updated first reference amount with a selected one of said second reference amounts to produce an updated second reference amount as a function of the difference therebetween and for operatively replacing in said storage means said selected one of said second reference amounts with said updated second reference amount, and comparison means for producing a binary output as a function of the relative magnitude of one of said input signal representing amounts and an updated second reference amount.

2. A thresholder, defined in claim 1, wherein said information storage means includes means for storing a second reference amount corresponding to each elemental position along said first dimension of said image, and wherein said selected one of said second amounts is selected as a function of its adjacency to the second said one of said input signal-representing amounts.

3. A thresholder, as defined to claim 1, wherein said first combining means comprises means for calculating the difference between said one input signal-representing amount and said first reference amount, table look-up means responsive to said difference for producing an update factor, and means for combining said update factor with said first reference amount to produce said updated first reference amount.

4. A thresholder, as defined in claim 3, wherein said second combining means comprises means for determining the difference between said updated first reference amount and said selected one of said second reference amounts, table look-up means responsive to said last mentioned difference for producing an update factor and means for combining said update factor with said selected one of said second reference amounts to produce said updated second reference amount.

5. A thresholder, as defined in claim 1, further comprising delay means for causing the second said input signal-representing amount to be delayed in time with respect to the updated second reference amount computed therefrom.

6. A thresholder, as defined in claim 1, further comprising calibration bias table look-up means for relatively modifying the second said one of said signal-representing and updated second reference amounts, prior to their application to said comparison means.

* * * * *